United States Patent
Jayan et al.

[11] Patent Number: 6,104,015
[45] Date of Patent: Aug. 15, 2000

[54] CONTINUOUS MICROWAVE ROTARY FURNACE FOR PROCESSING SINTERED CERAMICS

[76] Inventors: Ponnarassery Sukumaran Jayan, Quarter No. 1 Carborundum Universal Ltd Kalamassery Development Plot, Cochin 683109; Narayanan Ananthaseshan, 19th J M Gardens, Pallikkavu Temple Rd., Vaduthala, Ernakulam 682 023; Balachandran Subramaniam, "The Kasl", Yamuna Nagar, South Kalamassery Cochin University P.O., Kochi 682 022; Murugappan Vellayan Murugappan, 15, Boat Club Rd., Chennai 600 028, all of India

[21] Appl. No.: 09/227,872

[22] Filed: Jan. 8, 1999

[51] Int. Cl.$^7$ ..................................................... H05B 6/78
[52] U.S. Cl. .......................... 219/700; 219/678; 219/756; 419/6; 419/7; 419/10
[58] Field of Search .................................... 219/700, 756, 219/701, 702, 686; 51/309, 293; 419/6, 7, 10

[56] References Cited

U.S. PATENT DOCUMENTS

| | | | |
|---|---|---|---|
| 2,467,230 | 4/1949 | Revercomb et al. | 219/700 |
| 3,508,023 | 4/1970 | Ueda et al. | 219/700 |
| 4,280,033 | 7/1981 | Wagener et al. | 219/700 |
| 4,663,507 | 5/1987 | Trerice | 219/694 |
| 4,879,444 | 11/1989 | Bichot et al. | 219/684 |
| 5,525,783 | 6/1996 | Tran et al. | 219/700 |
| 5,858,037 | 1/1999 | Jayan et al. | 51/309 |
| 5,902,510 | 5/1999 | Balbaa et al. | 219/698 |

*Primary Examiner*—Teresa Walberg
*Assistant Examiner*—Jeffrey C Pwu
*Attorney, Agent, or Firm*—Felsman, Bradley, Vaden, Gunter & Dillon, L.L.P.

[57] ABSTRACT

This disclosure sets forth a microwave sintering process for green oxide particles introduced from a source such as a hopper or a container, a downwardly directed funnel and a discharge outlet from the funnel. Particles are introduced into an elongate rotatable tube. The tube is inclined at a controlled angle. Particles traverse the tube, passing through a central heating zone between inlet and outlet. The time interval of the particles in the heating zone is controlled by adjustment of the angle of inclination, particle size, and rotation rate to assure that all particles are processed and converted from green to sintered oxide particles.

15 Claims, 1 Drawing Sheet

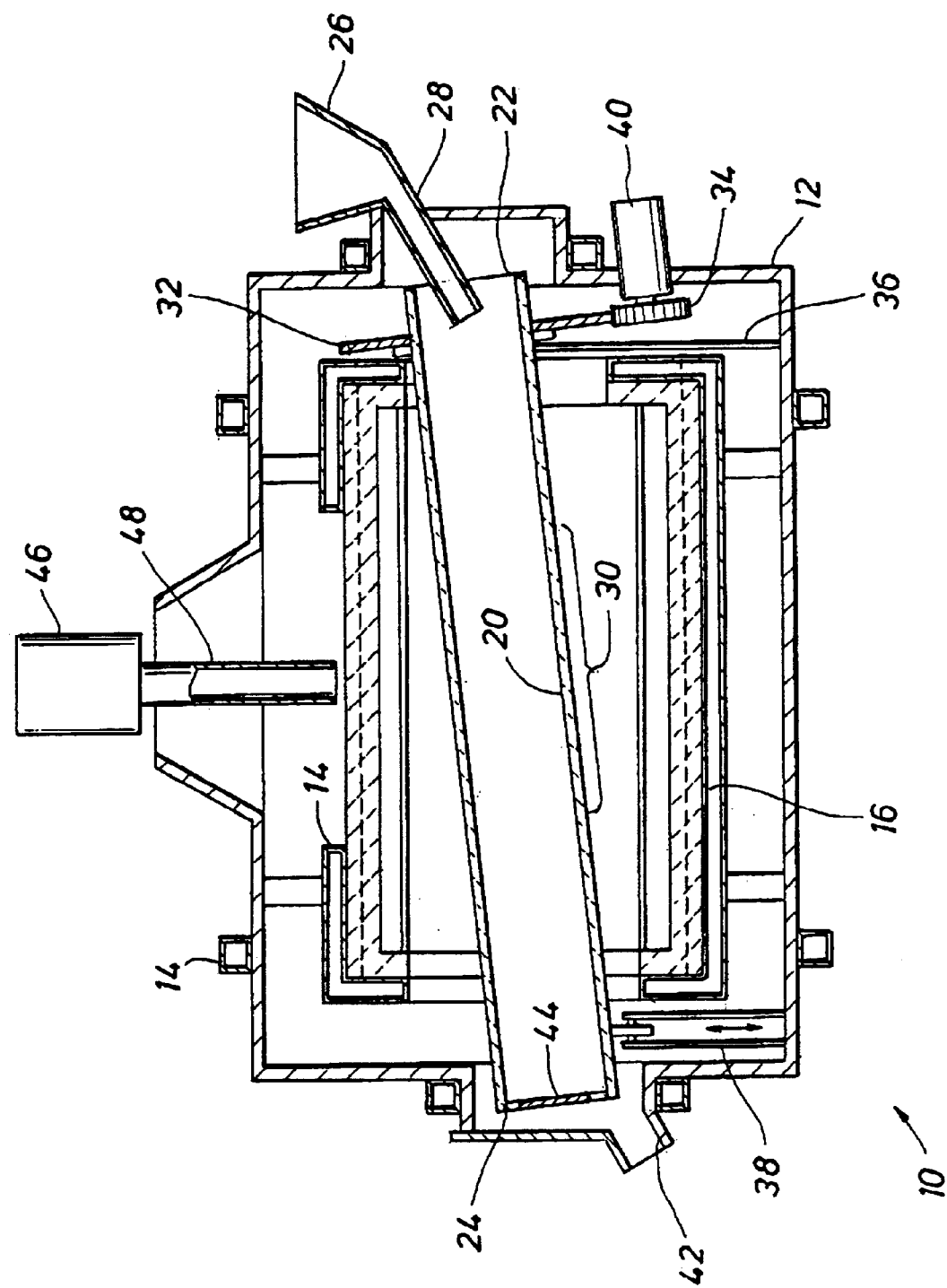

CONTINUOUS MICROWAVE ROTARY FURNACE FOR PROCESSING SINTERED CERAMICS

BACKGROUND OF THE DISCLOSURE

Raw alumina is mined and used for any number of purposes with alumina as one of the compounds. Various forms of alumina are known with varying water content even in the raw/synthesized stages. This serves as the basic feed stock for a number of products. One particular process step that is important to the present disclosure is the conversion of alumina in the processed form into other products. For example, alumina if appropriately heated to the level of sintering forms particles of a controlled size and weight which have substantial use in abrasives, abrasive wheels, grinding materials and the like. Attempts have been made at processing the green alumina, i.e., mined alumina having hydrate water associated with it in a variety of particle sizes; these attempts have been successful provided the alumina can be placed in a suitable powdered form preliminary to sintering. Sintering in a heated oven has a limited level of success. Long time intervals are normally required to achieve the excessive temperatures necessary which first drives off the water and volatiles prior to sintering. After the water and other volatile parts are vaporized, the alumina has to be rearranged (in a technical sense), that is it, must be converted from the initial state into a suitable state for sintering in this fashion. That has limited success and can be done, but at a cost. One cost is the fuel consumption required for the heating process. Another cost is the occasional loss by converting the alumina into a undesired chemical forms.

Recently, it has been discovered that alumina can be microwave sintered. This has had a measure of success also. For example, recently issued U.S. Pat. No. 5,858,037 of the present applicant sets out an alumina processing procedure utilizing alumina transported in a hollow upstanding tube. The microwave procedure provides good control of the process at reduced utility cost. There is, however, a negative to this. One negative relates primarily to the shrinkage which occurs when heated to higher temperatures. There is the initial loss of volatile matters, leaving porosity inside the material followed by rearrangement of molecules change crystalline struructure, phase and densification. When actually done in an upstanding circular tube, there is a tendency of the alumina material to be sufficiently and appropriately rearranged into the crystalline structure while material shrinkage occurs. This shifts the physical location of the particles as they are fed through the hollow cylindrical tube. Where the tube passes through the immediate vicinity of a microwave chamber where heating does occur, the concentration of the heat in the center of the elongate cylindrical mass is different in comparison with the particles at the exterior. When shrinkage occurs, the change in the mass with the resultant shrinkage changes the velocity in the tube. Particles near the centerline axis and midportions of the tube travel through the heating zone at a specified velocity. With shrinkage, however, the tube which is full above will then not be so full below the heating zone. With this volumetric loss, the standing column of alumina particles in the tube will shrink around the periphery, thereby pulling away from the side walls of the tube. Effectively, this creates a side wall gap which is below the heating zone. When that gap is formed, material funnels down into the gap along the side wall of the tube. As this material falls through the gap and refills near the bottom of the tube, it changes the intended transit time for the particles that fall into that gap. Therefore, a particle which is located at the centerline axis of the tube will proceed through the heating zone at the calculated velocity. This velocity is determined by the rate at which the particles are removed from the bottom of the tube while new particles are added at the top. Next to the tube wall, particles fall into the gap and do not spend an adequate interval in the heating zone. They are "undercooked" so to speak. While the particles at the center are properly heated at the right temperature in the right interval and form highly desirable sintered alumina particles finding application in other procedures, those alumina particles near the side wall will fall through so rapidly that they are undercooked and are therefore still green, not fully processed. They do not achieve the desired crystalline structure. They may contain some volatile matter and/or would lack in density/hardness requisite for abrasive job application. They may also still lack the hardness requisite for abrasive job applications. Finally, they still are mixed in with the other particles which are adequately processed. There might be some remote chance for sintering of these unsintered or under processed particles as they escape from the micorwave high temperature zone. But this normally is not sufficient enough to accomplish post microwave processing of green particles into the desired form which is accomplished primarily in the micorwave zone. In effect, when the process is not efficient and creates a separation problem, it adds a postmanufacturing step. That separation problem requires the separation of the processed particles which then become highly desirable very hard alumina particles for use in abrasive wheels and the like; the other alumina particles represent a waste portion in the manufacturing process. This waste portion has to be dealt with so that they do not continue to pose a problem.

The present disclosure sets out an improved alumina microwaving process mechanism and procedure. In this, alumina particles are fed in through a chute into a tube. The tube is set at an angle which will be discussed. The tube is rotated at a slow rate of speed to assure that the particles in it are tumbled, moved against the side wall and are relatively firmly packed. When this is done, the rotating tube then permits the alumina particles to move into and out of a zone. So to speak, the zone is maintained in a desired microwave energy field to assure appropriate cooking. By apt choice of the length of the tube, the diameter of the tube, the rate of removal and therefore the rate of adding particles to the tube and the microwave energy levels chosen, suitable microwave sintering can be accomplished. At the end of the process, it is able to discharge all the particles as the finished alumina sintered particles. They are not mixed with half cooked alumina particles which may still have water in the molecules, and the alumina is converted into the desired crystalline form.

SUMMARY OF THE PRESENT APPARATUS

This apparatus sets forth a housing with a frame which encloses a water cool chamber. There is an external feed trough which permits green alumina particles to be dumped into the feed trough. The particles feed down into a rotating ceramic tube. The tube is elongate, circular in cross section, made of a heat resistant ceramic, and is mounted on a mechanism so that it rotates. It is positioned with the inlet end raised and the outlet end connects to a discharge path. A mechanism rotates the tube. The tube is controllably positioned at the desired angle. Moreover, the tube is positioned in a microwave radiation chamber. Radiation frequencies are selected so that the ceramic is transparent to the microwave energy while the alumina interacts with it for heating to drive off water and to rearrange the molecular structure into the desired hard crystalline particles. The discharge product is the completed processed alumina particles which are then said to be microwave sintered and are ready for use in other postmanufacutred processing to make loose particulate abrasives, abrasive wheels and so on.

DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The only view is a sectional view through a continuously operated, continuous feed microwave powered rotary tube cooperative with a furnace convert green alumina particles into the desired abrasive particle upward stream.

DETAILED DESCRIPTION OF THE PREFERRED EMBODIMENTS

Attention is directed to the only view in the drawings where the numeral 10 identifies the processing apparatus shown in sectional view. This structure includes a framework made integral with a shell or housing. This has the form of a cover 12 which encloses the entire structure. For purposes of cooling, the structure is provided with a water jacket with a number of lines 14 which extend around the device. Moreover, this construction incorporates a pump (not shown) which circulates the water to assure that proper cooling to a desired temperature is accomplished. On the interior, there is something similar to a firebox which is an insulated shell 16 preferably formed of ceramics, and in particular formed of ceramics which are transparent to microwave energy. This has the shape of an elongate cylinder which is open at both ends. The water jacket 14 is positioned on the exterior to assure cooling of this to the desired temperature. As will be understood, the cooling is relative and calculated to assure that internal operational temperatures are achieved which accomplish the desired purpose.

The shell 16 has a specified length and diameter. This length and diameter are somewhat large in comparison with a sloping ceramic tube 20 positioned on the interior. The tube 20 has a specified length and diameter. In particular, the tube 20 is made of transparent ceramic material to enable microwave energy to pass though it also. The microwave energy is coupled to the processed green particles as will be described momentarily. The tube 20 has an open end 22 which is raised, and a lower end 24 which is lowered. The center line axis of the tube defines an angle (with respect to the horizontal) 0° and 90°. In the preferred embodiment, the range is about 5° up to about 30° and the optimum or the preferred angle is 10° to 15° for grain sizes from 4 mesh up to 30 mesh. The angle of inclination is highter for still finer powders and less for more coarse granules. The tube 20 has a length to diameter ratio of at least about 5:1 up to about 20:1. Again, while the tube can be much longer, the desired ratio is somewhere around 6:1 to about 10:1. Greater length in this probably does not add any particular benefit but is sometimes desirable so that the two ends of the tube are more easily exposed and away from the processing which occurs on the inside of the tube. The open upper end of the tube 22 is positioned adjacent to a funnel 26 which connects with a discharge tube 28. The discharge tube is routed so that it discharges particulate material into the tube, and sufficiently into the tube so that it does not tumble out the open end. Consider for the moment the fact that the material introduced into the tube is particulate, finely granulated and is continuously delivered into the tube. If the tube did not slope in the intended fashion, the newly introduced material would form a pyramid or pile, and some of that particulate material might fall out the opening 22. Rather than permit that, the tube is sloped in the intended downhill direction so that material falls down into the tube, not out the open end. Also, as continued rotation occurs, newly introduced material tumbles into the tube 20 and into the processing zone. The processing zone is the central portion of the tube and is indicated by the bracket 30. This is the center region where the alumina is primarily heated and where heating converts the particles into the appropriate crystalline structures to be described.

The tube is provided with an external sprocket 32 which has the form of a ring gear and a mating sprocket 34 is engaged with it. The tube is supported on a support 36 so that the right hand end is raised. The tube is supported at the left hand end on a pair of spaced rollers on an upstanding clevis 38. The clevis is raised or lowered to change the angle if that is desired. The clevis moves up and down to change the location of the tube end 24. The sprocket 32 is engaged by the drive gear 34 which in turn is connected with a motor 40 which is rotated at a desired rate to turn the tube at a controlled speed. Thus, two major operating parameters for this system are controlled by the equipment just mentioned, namely the motor 40 controls speed to thereby vary the rate at which it turns, and the clevis 38 is made longer or shorter to change the angle somewhat. The open end of the tube identified at 24 is positioned opposite an outwardly directed funnel 42. The funnel 42 is situated beneath the open lower end. The tube is optionally controlled in terms of discharge rate by a transverse plate 44 at the end of the tube; this can span part of the open end, and provides an opening which varies anywhere from about 1% of the total cross sectional area up to 100% of the cross sectional area which is accomplished by omitting the transverse plate 44. So to speak, this is a choke which controls the rate of discharge. More will be noted concerning that below.

The numeral 46 identifies a microwave generator which is coupled to a wave guide 48. The wave guide 48 conducts the microwave energy and directs it into the region inside the sleeve 16 and enables the microwave energy to interact in the region 30 of the tube 20. This interaction is important to the sintering.

Consider now the process that is accomplished in the present apparatus. First of all, alumina is mined and relatively purified. It is delivered in particulate form. Typically, the batches processed are with a narrow size range like 14 mesh to 18 mesh (1.4 mm to 1 mm diameter). But particles that could be processed can vary from fine powders to large lumps. The narrow particle sizing improves uniformity and controls the process better. The green alumina particles are typically boehmite including some water which is typically up to about 30% by weight water. The pH is adjusted to somewhere in the range of 2 to about 4 by the addition of an exemplary acid such as nitric acid. To the extent that additives are required, these are mixed with the green alumina. The additives typically include iron, silicon, titanium, magnesium, yttrium, neodymium, lanthanum and so on. Commonly, these are provided in the form of oxides, nitrates or hydroxides, and the total of the additives will typically be about 0.1 to 7.0 weight percent as oxides. Commonly, the green alumina is mixed with these ingredients, and then the particles are formed by crushing. The particle sizes are assured by screening in the ranges just noted.

The next typical step involves preheating to a temperature range of perhaps 300° C. or slightly greater for up to about 30 minutes which will drive off the water vapor. Effectively, this provides a calcined grain. The process of the present disclosure yields an alumina abrasive grain having a hardness of 2,100 kg/sq.mm with a typical crystal size of less than 1 micron, optimally about 0.6 micron, with relatively uniform crystals.

By controlling the dwell time in the microwave oven, and by processing with an oven temperature in the range of about 1,400° C. for about 45 minutes, it is possible to provide a calcined and sintered crystal where the average crystal size is about 0.5 microns, the specific gravity is about 3.9 gm/cc, abrasion index of 85, and a hardness of 2,200 kg/sq.mm can be obtained. By using processing times ranging anywhere from 10 minutes on up to about 50 minutes and processing tube temperatures in the range of about 1,200° C. to about 1,450° C., crystals can be obtained having about a size of about 0.5 microns, specific gravity of about 3.84 to about 3.92, and hardness of about 1,850 up to around 2,200 can be obtained. The abrasion index will typically range from about 80 to about 100.

FIRST EXAMPLE OF FEED MATERIALS FOR THIS TYPE OF ROTARY FURNACE 400 gms of boehmite is dispersed in 2.4 liters of water and the pH brought down to 2.5. To this 3.46 g of ferric oxide is added in the form of its hydroxide followed by the addition of 0.62 g of TiO2 as its hydroxide and 0.78 g of precipitated silica and 0.51 g of calcia. Drying control chemical additive 2.0 g of polyethylene glycol is added. Seeding is done with 4.5 g of submicron sized alumina seeds 30.8 g of magnesium nitrate as solution is also added and dispersion continued for another half an hour. This was then dried at 80° C. and the dried gel was then crushed and graded to 14+18 mesh and calcined at 500° C. for half an hour. These were then fed into the continuous rotary furnace. The temperature measured at the surface of the ceramic tube was maintained at 1400° C. The output was controlled to a residence time of 45 minutes in the sintering zone, while in travel. The product was found to have a specific gravity of 3.88 g/cc and the grains were found to be uniformly sintered.

Another batch was prepared from 400 g of boehmite dispersed in 2 liters of water. The pH was brought down to 2.5. To the above sol were added 2.25 gms each of yttria, lanthanum oxide, ncodymium oxide followed by 1.15 gm of polyethylene glycol. The dispersion was continued and the alumina seeds were added and the dispersion was stopped after another 30 minutes. The grains were then prepared as in the above cases and sintered in the rotary furnace maintaining the tube temperature at 1400° C. Here also the grains produced were uniformly sintered without showing any undersintered grains and the specific gravity obtained was 3.9 g/cc.

The feed rate and the delivery rate can be adjusted by the interplay of the mechanical variables which are controlled. This includes the length and diameter of the tube 20 and the angle of inclination. It also relates to the width of the heated zone 30. In addition, it ties to the rate of introduction of the green particles into the funnel 26 and the rate of removal from the funnel 42. In the latter instance, that ties to the rate of discharge permitted by the choke 44. By running the device at a controlled rotational speed, particles are tumbled and are exposed to the microwave illuminated zone. The dwell time can be changed. Dwell time relates in part to the maximum temperature achieved. That depends on the power level of the microwave generator 46 and by choosing the rate of rotation, and by controlling the rate of input and the rate of discharge, the dwell time can be controlled. More importantly, every particle that is introduced is tumbled so that on average they all have a common transit time through the zone 30. This inclined processing procedure insures more uniform processing, hence more uniform output. Also, it assures that the finished product is brought to the desired hardness. In other words, appropriate dewatering occurs along with the conversion into the hard particles that are desired for this process.

The procedure described in this disclosure is particularly advantageous when used with a microwave generator of 2.45 Gh where the transmitter 46 is operated in a continuous wave (CW) mode. The CW transmission sets up a standing wave delivering energy through the wave guide 48 and into the chamber. Because the tube 20 is transparent, the microwave energy is permitted to pass through the various ceramic components and into the green particles. As the tube rotates, the particles migrate to the downhill in the tube, but they are exposed to the microwave energy. Microwave coupling of the energy into the particles results in rapid heat increase on the inside of each particle. This assures heating to the desired level.

While the foregoing is directed to preferred embodiment, the scope thereof is determined by the claim which follow:

1. Ceramic sintering apparatus comprising:

(a) a feed of particulate granular green oxide particles;

(b) an elongate tube having an open upper inlet end and a lower open outlet end and a heating zone between the ends to receive a flow of particles moving through the tube in a controlled time interval in the heating zone, wherein said tube is attached within a cylindrical housing to a support therein, and said tube is positioned at an inclined angle with respect to the major axis of said cylindrical housing;

(c) a drive moving said tube so that particles move toward the outlet end thereof;

(d) a microwave generator operatively connected to direct microwave energy into said zone to heat the particles for a desired time and temperature to sinter the particles; and (e) said support for said tube controls said angle of inclination so that said green oxide particles are moved along the tube for the desired time controlled by the inclination of the tube.

2. The apparatus of claim 1 including an overhead container of green ceramic particles, a funnel from said container extending downwardly and having an outlet discharge end positioned at the open upper inlet end of said tube, and further including a gate having an opening therein at the outlet end of said tube to control the rate of discharge of particles passing out of the tube.

3. The apparatus of claim 2 wherein the major axis of said cylindrical housing is horizontal, and said tube is positioned at an inclined angle with respect to horizontal.

4. The apparatus of claim 1 wherein said tube is rotated by a variable speed drive and the drive is connected to a gear for rotating said tube.

5. The apparatus of claim 1 wherein said support comprises a roller mechanism supporting said tube and said support is adapted to be raised or lowered so that said inclined angle of the tube is varied.

6. The apparatus of claim 5 wherein said support further comprises a vertically movable, adjustable, and lockable upstanding mount under said tube.

7. The apparatus of claim 5 wherein said support comprises elongate, spaced first and second members, wherein the first member is positioned closer to the inlet end and is fixed structurally and the second member is positioned closer to the outlet end and is movable.

8. The apparatus of claim 1 wherein said green ceramic particles are introduced into said tube at a controlled rate, and are accumulated in said tube while said tube is rotated, thereby exposing the particles to the microwave energy for sintering, and said heating zone spans the full width of the tube so that all particles of the tube are exposed to the microwave energy.

9. The apparatus of claim 1 wherein said tube is transparent to the microwave energy and has a transverse gate at the outlet end with a gate opening of specified size therein.

10. The apparatus of claim 6 wherein said support inclines said tube at an inclined angle of 10° or more for particles in the size range 4 to 30 mesh.

11. The apparatus of claim 10 wherein the inclined angle is up to about 15°.

12. A method of processing a flow of particulate granular green oxide particles wherein the process comprises:

(a) positioning an rotatable tube within a cylindrical housing and at an inclined angle with respect to the major axis of said cylindrical housing so that the tube has an opened upper inlet opening for admission of green oxide particles, and a lower outlet opening remote from the inlet, and the tube includes a central heating zone;

(b) applying microwave energy from a microwave energy generator to the tube for heating thereof so that the green oxide particles are sintered;

(c) adjusting the inclined angle of the tube and the rotation of the tube so that the green oxide particles introduced into the tube have a specified time interval in the heating zone to obtain heating of the particles for uniformity of sintered particles, wherein the particles discharged at the outlet end are sintered; and (d) operating a microwave generator to form microwave energy for heating the particles for processing of the green oxide particles.

13. The method of claim 12 wherein the tube is inclined at an angle with respect to the horizontal of at least about 10°.

14. The method of claim 13 including the step of adjusting the inclined angle of inclination up to about 30°.

15. The method of claim 12 including the step of controllably feeding the green ceramic particles into the tube, and controlling the discharge through the outlet end thereof by adjustment of a gate having an opening therein to increase or decrease the rate of discharge of sintered oxide particles.

* * * * *